US007803417B2

(12) United States Patent
Whited et al.

(10) Patent No.: US 7,803,417 B2
(45) Date of Patent: Sep. 28, 2010

(54) NUT BUTTER VARIEGATE AND PROCESS FOR PREPARING

(75) Inventors: Sonya Annette Whited, Piscataway, NJ (US); Christopher Burce Puno, Neshanic Station, NJ (US)

(73) Assignee: Unilever Bestfoods North America, Englewood Cliffs, NJ (US)

( * ) Notice: Subject to any disclaimer, the term of this patent is extended or adjusted under 35 U.S.C. 154(b) by 605 days.

(21) Appl. No.: 10/976,335

(22) Filed: Oct. 28, 2004

(65) Prior Publication Data

US 2006/0093727 A1 May 4, 2006

(51) Int. Cl.
*A23L 1/38* (2006.01)
(52) U.S. Cl. ............ 426/633; 426/115; 426/335; 426/394; 426/410; 426/516; 426/615
(58) Field of Classification Search .......... 426/72, 426/73, 74, 658, 115, 394, 516, 335, 615, 426/633, 410
See application file for complete search history.

(56) References Cited

U.S. PATENT DOCUMENTS

| 2,750,077 | A | * | 6/1956 | Lurie | 222/135 |
| 2,803,381 | A | * | 8/1957 | Vouderis | 222/135 |
| 4,015,644 | A | * | 4/1977 | Kinney | 141/9 |
| 4,479,758 | A | * | 10/1984 | Hersom et al. | 417/388 |
| 6,623,783 | B1 | | 9/2003 | Wong et al. | |
| 6,860,958 | B2 | * | 3/2005 | Swafford et al. | 156/251 |
| 2003/0009987 | A1 | | 1/2003 | Germick et al. | |
| 2003/0211224 | A1 | * | 11/2003 | Eichelberger et al. | 426/633 |
| 2005/0069660 | A1 | * | 3/2005 | Climenhage | 428/34.3 |

FOREIGN PATENT DOCUMENTS

| EP | 0178377 | * | 4/1988 |
| EP | 0675046 A1 | * | 1/1994 |

OTHER PUBLICATIONS

Packaging Machinery and Equipment (www.google.com/search? 2007.*
"Radios Being Dropped to woo Afghan Hearts", Straits Times (Singapore), Oct. 2001.
"A Sticky State of Affairs", Congressional Quarterly DBA Governing Magazine, Sep. 2001.
Jerry Boy PB N' Go peanut butter is described at http://www.clorders.com/jerryboy.htm.

* cited by examiner

*Primary Examiner*—Helen F Pratt
(74) *Attorney, Agent, or Firm*—Gerard J. McGowan, Jr.

(57) ABSTRACT

In a first embodiment, the invention is directed to a process for making a variegated nut spread comprising (a) forming an enclosure from a film, b) pumping a nut spread into the enclosure; and (c) before, during, or after step (b), pumping in a separate stream of an inclusion to form a variegated nut spread; and (d) sealing the enclosure to form a container without homogenizing the nut spread and inclusions. The inclusion is generally another food component which is desirably eaten with peanut butter, such as fruit filling variegate, banana, marshmallow filling, chocolate, bacon bits, etc. The invention is also directed to a nut spread, comprising discrete inclusions selected from the group consisting of chocolate syrup, fruit and mixtures thereof. The inclusions in the nut butter of the inventions are discrete so that consumers can experience simultaneously organoleptic properties both of the inclusions and the nut butter.

10 Claims, 2 Drawing Sheets

NUT BUTTER VARIEGATE AND PROCESS FOR PREPARING

BACKGROUND OF THE INVENTION

Peanut butter is widely enjoyed and finds a variety of uses. The most common use of peanut butter is in preparing sandwiches. Product characteristics which are responsible for peanut butter's wide acceptance and popularity are its flavor, its good nutritional properties and its suitability for consumption alone or in combination with a variety of other foods.

While peanut butter is much appreciated as a food, individuals assigned to clean eating utensils often feel differently. Peanut butter tends to adhere to knives, spoons and the like. Removal of peanut butter from those objects is a nuisance at best; any member found to have left peanut butter on a utensil during an after hours snack may well be ostracized within his household.

Recently, new forms of peanut butter products have been marketed. These include squeezable peanut butter in the form of sticks and tubes. The sticks afford a nutritious snack, especially for children. Both forms provide a convenient way to eat peanut butter while avoiding the chore of cleaning peanut butter from a utensil.

Peanut butter has also been marketed in admixture with other ingredients such as chocolate. Unfortunately, these products have tended not to afford consumers the distinct and enjoyable sensations afforded by each of the ingredients individually.

A variety of peanut butter products have been reported in the popular and the patent literatures.

An article entitled "RESERVISTS BRING THEIR BOSSES ALONG ON TRAINING; CIVILIANS RIDE HUMMERS AND HELICOPTERS AND SNACK ON MRES" in the Nov. 4, 2001 issue of the St. Louis Dispatch describes someone squeezing peanut butter from a tube onto a cracker.

In the Oct. 17, 2001 edition of the Straits Times (Singapore), an article with a headline entitled "Radios Being Dropped to woo Afghan Hearts" describes a drawing showing how tubes of peanut butter should be squeezed.

An article in the Congressional Quarterly DBA Governing Magazine dated September, 2001 accompanied by the headline: "A STICKY STATE OF AFFAIRS" mentions that California prisons pack plastic peanut butter and jelly "squeezes" in lunch bags for prisoners who have off-site job.

The Pantagraph of Aug. 12, 2001, in a headline entitled "Scout records events of national conference" mentions that in 1997, the Scouts had crackers, squeeze cheese, squeeze peanut butter, squeeze jelly, and trail mix.

CNN THE SPIN ROOM 22:30 of May 14, 2001 reported that a company called P.J.'s Squares, has sent to the White House a couple of cases of little plastic squeezey things, like you might get mustard in or mayonnaise, but these are full of peanut butter and jelly.

Newsletter Database™, Copyright 2001 Marketing Intelligence Service Ltd., Product Alert of Mar. 26, 2001 discloses "Squeezers," available from Portion Pac, Inc., located in Mason, Ohio. The 2.12 oz. pouches of Peanut Butter & Concord Grape Jelly Combo and Peanut Butter & Strawberry Jam Combo are presented in boxes that state, "Nutritious and fun—Grab and go—Easy lunches—Hiking, biking, camping, sporting events—No cutlery needed." Squeezers is said to be a registered trademark of Thermo Pac, Inc.

The West County Times of Sep. 10, 2000 in an article about scouts mentions lunching on crackers with squeezable peanut butter and jelly.

An article in The Washington Post on Aug. 30, 2000, p F01 entitled EYE ON THE AISLES; Jump for Jerky by Carole Sugarman mentions that "last September" a Los Angeles company named Visionary Brands rolled out Peanut Squeeze—peanut butter in an easy-to-squirt plastic bottle.

The Enertia Trail Foods catalogue on the Internet at least as early as Sep. 16, 2002 shows a "Peanut Butter Squeezers" product in a mayonnaise-type pouch. On page 11, a "Peanut Butter/Jelly Combo Squeezers" product is mentioned.

Wong et al. U.S. Pat. No. 6,623,783 is directed to a fluid suspension of sugar and oil which is useful in making nut spreads having high levels of sugar. It is said that having the sugar in the form of a fluid suspension with the oil allows the sugar to be easily mixed with the nut solids containing mixture. The combining of the sugar and oil and the nut solids-containing mixture can be made continuous such as by co-blending the two streams in a static or in-line mixer or series of mixers. The water soluble solids in the fluid suspension such as the sugar, salt and the like preferably have a relatively fine particle size. Chocolate may be blended into the Wong et al. nut solids mixture. Many flavorants are mentioned and it is said that these can be delivered from flavored or flaked bits. Wong et al. prefer cocoa solids enrobed or encapsulated by sugar, which are said to impart a more milk chocolate-like flavor and avoid imparting a bitter aftertaste to the nut spreads. The nut spreads are said to be prepared by combining the fluid suspension and the nut solids-containing mixture so as to form a substantially homogeneous blend. Intense mixing such as high shear mixing is said not to be required. In Example 2, apple flakes are added via an ingredient feeder.

Germick et al. US Patent Application Publication No. 2003/0009987 discloses a food product, preferably a food ingredient, in the form of a dye, pigment or similar colorant in a random pattern in a refrigerated, thixotropic, food material, preferably a cultured dairy product and most preferably refrigerated yogurt held in a flexible wall pouch. The second food ingredient is said to remain in the irregular and random pattern for the intended shelf life of the product. The food ingredient is produced by supplying the food ingredient through a supply tube extending through an injection tube and into a fill pipe and a fill tube.

Jerry Boy PB N' Go peanut butter is said to come in five flavors in both creamy and crunch. Flavors include Cinnamon Surprise, Munchy Crunchy, Jalapeno Kick, Caramel-Carmel Crunch and Dreamy Creamy. The products are described at http://www.clorders.com/jerryboy.htm.

A product has been sold in the United States under the name Jif® Smooth Sensations, which includes blended peanut butter and chocolate.

A product, Doubly Delicious, has been sold in the United States under the Skippy® brand which includes peanut butter and distinct chocolate pieces.

Despite all of the attention which has been directed to peanut butter products, and the use of peanut butter combined with other components, there is a need for peanut- and other nut butter products where the nut butter is combined with one or more other components in such a way that consumers can readily perceive the presence of both, including their individual favorable organoleptic sensations. There is further a need for readily applied peanut butter products admixed with other, separately perceivable, desirable edible components, such as jelly and chocolate.

SUMMARY OF THE INVENTION

The present invention is directed to a process for making a variegated nut spread and to the spread which can be made by the process. It has been discovered that a variegated nut spread can be made by (a) pumping a nut spread into a container such as a single serve tube; (b) before or after step (a), pumping in a separate stream of an inclusion to form a variegated nut spread; and (c) closing said container without homogenizing said nut spread and inclusions. The process of the invention permits the preparation of a nut spread which comprises discrete, separately perceivable inclusions such as a chocolate syrup. By forming the inclusions as discrete pieces or streams, the consumer is better able fully to enjoy the separate organoleptic impression of the inclusion in addition to that of the base nut spread. Otherwise, typically an "average" impression which combines the impressions of both but which may well lack the organoleptic appeal of either, may be obtained.

The inclusion can be in the form of a liquid or semi-solid, such as a structured stripe, or as particulates. If liquids or semi-solids, the inclusions are preferably added using a simple piston filler such as a Dangan filler available from Dangan-North America of Marina, Calif. If particulate, the inclusions may be added via an enrober. Any particulates are preferably less than ⅜" in size.

The invention is also directed to a nut spread, especially combined with a tube, having discrete, separately perceivable inclusions such as chocolate syrup and chocolate morsels, which have not been homogenized. The product is made by combining finely milled ground roasted peanut slurry with additional flavorings (sweetener, salt, etc.) and stabilizing ingredients. The inclusions may be provided in a liquid stream pumped into the tube at 20-40 wt. % or by solids in an enrober.

In accordance with a preferred feature of the invention, the product of the invention is contained within a tube, e.g., a single serve tube. Especially preferred is the use of squeezable tubes, with or without an applicator cap having a dispensing orifice.

The nut butter can be a peanut butter under the FDA standard of identity or some other nut spread such as a nut cream. If desired, it can be formulated to be particularly squeezable, yet creamy, and/or it can be formulated to be low in carbohydrates, fat or other ingredients.

In accordance with the invention, the nut spread is combined with the additional, discrete food component, an inclusion, which is desirably eaten with peanut butter, such as a filling or a particulate. The nut spread and additional food component are combined in such a way that the presence of the additional component is discernable as a separate component, visually or by taste. The inclusion may, for example, add solids, texture and/or flavor. Examples of inclusions include fruit flavored variegates, banana, marshmallow filling, chocolate, bacon bits, etc.

The nut spreads used in the invention include stabilizer, but in limited amounts. Levels of from 0.5 wt. % through 1.75 wt. % are preferred. The stabilizer is preferably a fully or partially hydrogenated vegetable oil. The inclusion of modest amounts of stabilizer facilitates formulation of a nut spread which is squeezable and has good mouth feel but does not flow uncontrollably.

For a more complete understanding of the above and other features and advantages of the invention, reference should be made to the following detailed description of preferred embodiments and to the accompanying drawings.

DETAILED DESCRIPTION OF THE INVENTION

Figure 1:
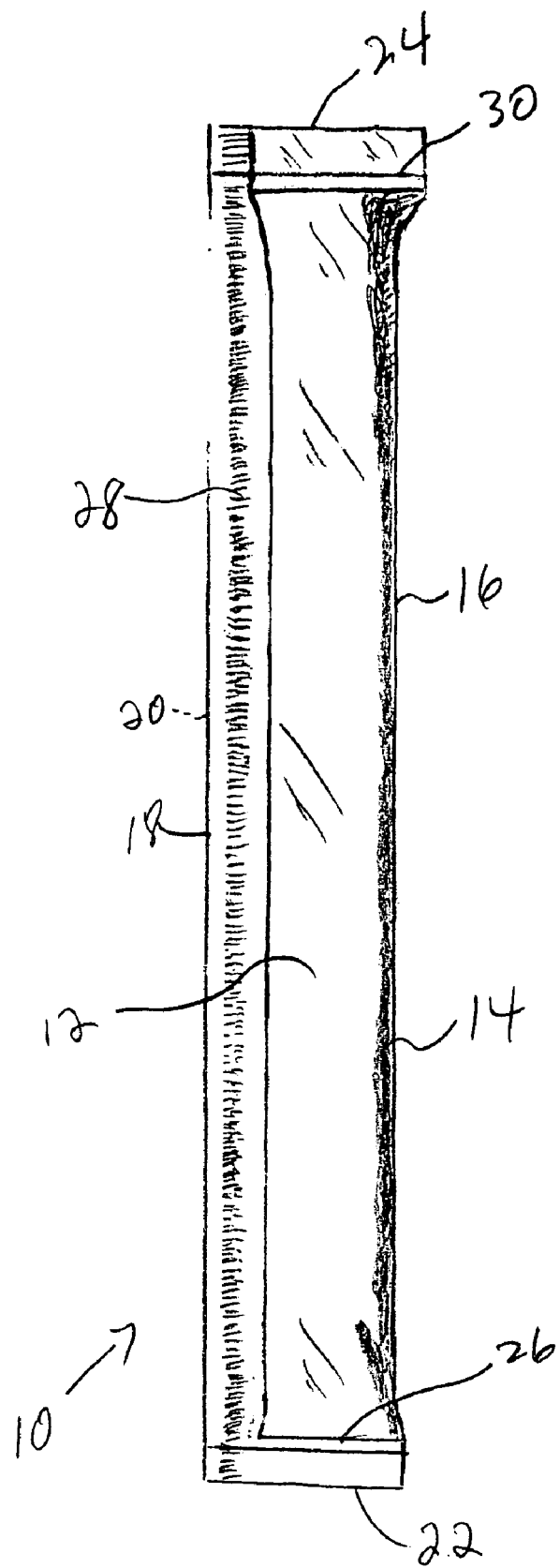
FIG. 1 is a front elevational view of a tube of peanut butter and additional edible component in accordance with the present invention.

By "homogenization" herein is meant mixing together such that the product appears substantially uniform to the naked eye.

The squeezable peanut or other nut butter or spread which may be used in the invention may include high melting (145°-155° F.) vegetable oil stabilizers of palm, cottonseed and similar vegetable oil origins at a level of from 0.5 to 10 percent, preferably from 1 to 5%, preferably from 1 to 1.75%. The stabilizer tends to reduce liquid oil separation and to improve the viscosity of the product.

The preferred base nut spreads into which the inclusions are pumped fully comply with the FDA standard of identity for peanut butter as defined in 21 CFR (Apr. 1, 2000 edition) Section 164.150, namely they contain ground shelled and roasted peanut ingredients of at least 90 wt. % and a maximum fat content for the finished food of not greater than 55% when determined as prescribed in "Official Methods of Analysts of the Association of Official Analytical Chemists," 13th edition, (1980) section 27.006(a) under "Crude Fat-Official First Action, Direct Method. These also require that the standardized product contain no more than 10 percent of optional seasoning and stabilizing ingredients such as salt, nutritive sweeteners and hydrogenated vegetable oils and emulsifiers such as mono- and diglycerides. The percent by weight of peanuts can range from 90 to 95% and higher for standard peanut butters. An appropriate peanut butter for use in the present invention is sold under the Skippy® brand.

The peanut ingredients may be blanched peanuts in which the germ may or may not be included, and unblanched peanuts, including the skins and germ.

Appropriate seasonings and stabilizing ingredients include the following and combinations thereof; salt, sugar, liquid sugar, dextrose, honey, fructose, corn syrup, medium invert and invert sugars, maple syrup, molasses, liquid or powdered, peanut oil, particularly high flavor oil extracted from roasted peanuts, vegetable oils, fractionated vegetable oils and partially hydrogenated vegetable oils, including soybean, palm, coconut, cottonseed, corn, rapeseed, canola and peanut oils, saturated and unsaturated mono- and diglycerides and lecithin, polyglycerol esters and other food emulsifiers. It is preferred that the seasonings and stabilizing ingredients added to the peanuts do not exceed the 10% limit imposed by the Standards of Identity for peanut butter. In particular, the seasonings and stabilizers preferably constitute from 0.5 to 10%.

If needed, liquid molasses or dried powdered molasses may be added to improve the color of the final product. A suitable powdered molasses is MC-71, which is granulated so that 90% will pass though #100 U.S. standard sieve, supplied by Sethness Co., Chicago, Ill. 60647.

The mixture of peanuts, seasonings and stabilizers is ground into a fine paste for example via the use of milling equipment which is standard in the peanut butter industry, such as a Bauer and/or an Urshel mill. The milled peanut butter paste may be collected in a standard feed or supply tank fitted with a vacuum system to de-aerate the milled paste from any entrapped or entrained atmospheric air. It may also be de-aerated prior to milling.

Generally, the composition of the invention will include peanut oil. Optionally as supplement and to boost further the flavor intensity, a high flavor peanut oil may be used in this invention. The high flavor peanut oil is obtained by the extraction of oils from dark roasted peanut. As example of a high flavor peanut oil suitable for use herein is the high flavor peanut oil extracted from dark roasted peanuts supplied by Food Materials Corp., Chicago, Ill. 60618. The high flavored peanut oil may be added at levels of 0.5 to 3.0%. Also, dark roasted peanut paste may be used.

The further edible component(s) will generally be ingredients which are not within the Standard of Identity for peanut butter mentioned above. As indicated, further edible components used as inclusions in the nut spreads will generally be fillings or particulates. Fillings can be defined as sweet or savory food mixtures used to fill pastry, cake or sandwiches. For the peanut butter and other nut butters and spreads of the invention, the further edible components which may be added include fruit flavored variegate ($a_w$<0.62) (filling), chocolate (filling), chocolate and/or bacon bits (particulates) and marshmallow filling.

A more comprehensive list of examples of fillings/filling components includes: fruit, chocolate, jams/jellies, apricot, cherry, blueberry, guava, lemon, mango, raspberry, strawberry, papaya, marshmallow and banana. Often fillings will include a gel material such as a pectin. Gum bases, such as guar, are common.

The filling will generally be low in water and/or high in sugar. Fillings generally impart flavor/and or solids and/or texture to the food.

The fruit filling variegate may be any flavor, such as grape or strawberry fruit filling variegate. An example of a suitable fruit filling variegate is a grape filling available from Haarmann & Reimer. The ingredient statement for the Haarmann & Reimer grape filling is as follows:

Dextrose, Sugar, Corn Syrup, Water, Fructose, Glycerine, Modified Corn Starch, Grape Juice Concentrate, Natural Flavors, Apple Powder, Citric Acid, Salt, Soybean Lecithin, Propylene Glycol, Gellan Gum, Sodium Benzoate, Potassium Sorbate, Sodium Citrate, Red 40, Blue 1.

The further edible components may also be particulates, such as graham, puffed rice and chocolate morsels. Particulates may impart texture and/or flavor and/or solids to the food.

For some further edible components which may be mixed with the nut spread, it is important to consider the water activities of the further edible component and the nut butter. For instance, to promote compatibility, a variegate such as grape fruit filling, which is to be in direct contact with the peanut butter in a given packaging format has the following desirable characteristics:

The water activity must be at or below 0.62

The difference in water activity between the filling and the peanut butter must not be more than 0.3 units (to reduce osmotic pressure differences)

It is a good rule of thumb for all combinations of peanut spread and further edible component that the difference in water activity between the further edible component and the spread must not be more than 0.3 units (to reduce osmotic pressure differences)

Appropriate selection of water activity can favorably impact shelf stability by minimizing microbiological growth and leaching of water between the components.

For longer term stability, the filling should:

Be a low pH (<4.5)

Contain mold inhibiting preservative (Potassium Sorbate or Benzoate)

The further edible components, e.g., filling, may be used at levels of, say, 15-50 wt. % of the combined nut spread and filling. The further edible components may be combined in patterns. The nut butter or nut spread component, e.g. peanut butter, and the further edible component, e.g., fruit flavored variegate or other filling are mixed in discrete portions discernable to the consumer.

Preferred containers are Low Density Polyethylene (LDPE) tubes, which may be obtained from American Packaging. It may include an EVOH copolymer barrier layer. While a plastic tube is preferred, it may also be metallic, e.g., tin, aluminum, etc. Preferably the tubes are flushed with nitrogen prior to filling to prevent/minimize oxidation and oil separation. A safety seal or other consumer protection device can be employed. Suitable tubes are disclosed in, e.g., Eichelberger et al. U.S. patent application Ser. No. 10/244,284, the disclosure of which is hereby incorporated by reference.

Figure 2:
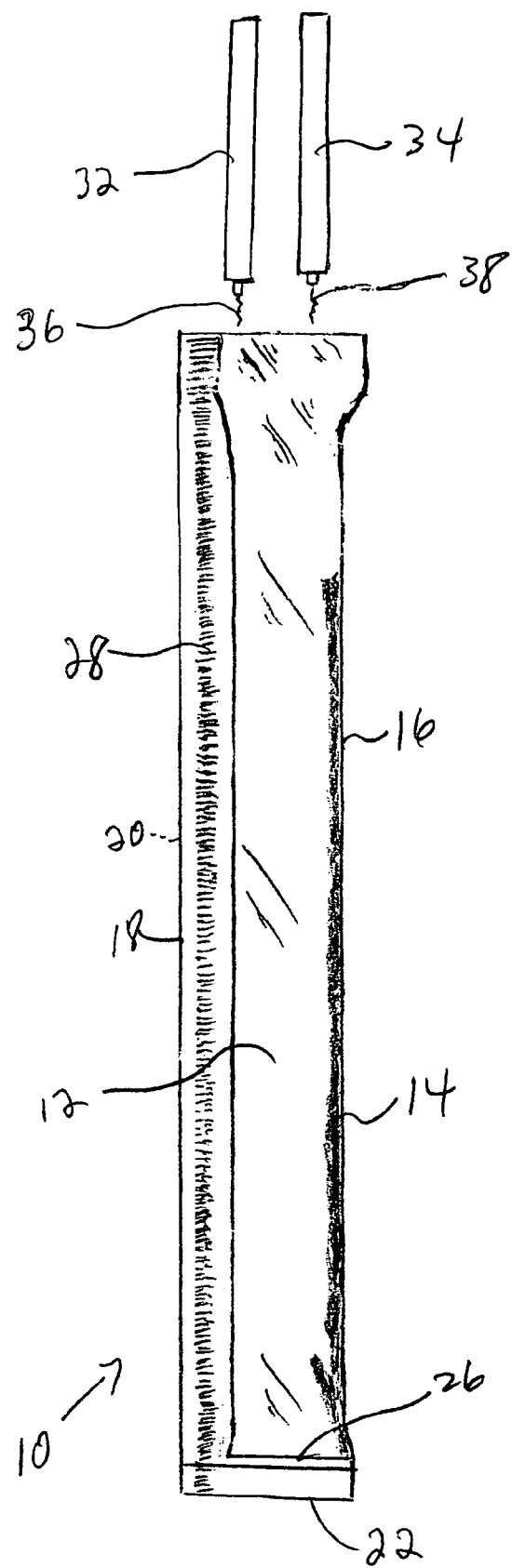
FIG. 2 is a front elevational view of the tube of FIG. 1 during filling and prior to sealing of its top end.

As seen in FIG. 1, tube 10, made of low density polyethylene (LDPE), has been filled with peanut butter 12 and chocolate filling 14, in accordance with the invention. Tube 10 can be formed using a flat sheet of LDPE, which is then folded along fold line 16. The flat sheet may be cut along superposed side margins 18, 20 and top and bottom margins 22 and 24. A heat seal 26 may be imposed adjacent and parallel to bottom margin 22 and along side margins 18, 20 at 28. As seen in FIG. 2, the peanut spread 36 and the further edible component 38 are then pumped into the open tube through the top prior to sealing the top margin, using, e.g., side by side Dangan fillers 32, 34. The top margin 24 may then be heat sealed at 30. Fillers 32, 34 are shown schematically and not to scale.

Product filling can be continuous where the equipment "squeegees" the product and seals the top, or it can be intermittent.

The consumer consumes the product by opening the end seal and squeezing the contents of tube 10.

Squeezable food products of the invention, e.g. a nut butter, may be prepared using the following procedure (the Preparation Procedure):

a) ground roasted full fat nuts are heated to a temperature above the melting point of the given stabilizer, for example to 145° F., especially 155-160° F. or above;

b) the ingredients are added to the heated slurry in accordance with the formulation and thoroughly mixed;

c) the peanut mixture is cooled to 125° F. and then fed into the primary milling operation Urschel Mill 10 at a rate to ensure particle size distribution of 90%<=40 microns, 50%<=13 microns and 10%<=3 microns with a mean diameter of 15-20 microns. The mill is model MG 1700 having a 206 head. The mixture emerges from the Urschel Mill at 165-170° F.;

d) the milled composition is deaerated using Versater 12 or vacuum kettle and cooled to approximately 130° F. in the Rotator;

e) the milled composition is deaerated, cooled to 155-160° F. before filling and filled at 85-90° F. filled at 85° to 95° F. into tubes;

f) The liquid or semi-liquid inclusions are pumped into the tubes at 20-40% by a filler pump;

g) The tube is closed by heat sealing the top of the tube without homogenization of the inclusions and the peanut butter; and h) the resulting peanut butter is a soft squeezable product having visibly and organoleptically distinct inclusions in addition to the peanut butter.

If, alternatively, the inclusion is a particulate, it may be pumped to the tube simultaneously with the peanut stream.

Alternative vacuuming and milling such as homogenizers, Colloid mills and Fryma mills are acceptable provided that the criteria in (e) have been obtained.

EXAMPLE

Prophetic

A peanut butter having the following ingredients is prepared.

| Ingredient | Level % |
|---|---|
| Peanut oil | 5.0 |
| Roasted peanuts | 86.3 |
| Stabilizer (hardened rapeseed oil blended with cottonseed oil and hydrogenated soybean oil | 1.0 |
| Sucrose | 6.2 |
| Salt | 1.5 |
| Total % | 100.000 |

The product is prepared (using the procedure described above) by milling under vacuum and then filling tubes with the peanut butter. The product is combined with 35 wt. % chocolate syrup using a Dangan piston filler and without homogenization due to mixing components prior to filler. A peanut butter having visible chocolate randomly distributed throughout the nut butter is obtained. The chocolate flavor is readily discerned separate and apart from the peanut butter flavor.

Unless otherwise explicitly indicated, or clearly required by context, percentages in this application are by weight.

What is claimed is:

1. A process for making a variegated nut spread consisting of:
   (a) forming a tubular enclosure from a film;
   (b) pumping a nut spread into the enclosure; and
   (c) during step (b), pumping into the enclosure a separate stream of one or more inclusions to form a variegated nut spread; and
   (d) then heat sealing the enclosure to form a container without homogenizing the nut spread and inclusions.

2. The process according to claim 1 wherein the nut spread is a peanut spread.

3. The process according to claim 2 wherein the peanut spread is a peanut butter.

4. The process according to claim 1 wherein the inclusion stream is pumped using a piston filler.

5. The process according to claim 1 wherein the inclusion is selected from one or more of the group consisting of fruit, chocolate, fruit flavored variegate, apricot, cherry, blueberry, guava, lemon, mango, raspberry, strawberry, papaya, marshmallow, banana, graham, puffed rice, bacon bits and mixtures thereof.

6. A process for making a variegated nut spread consisting of:
   (a) pumping a nut spread into a tube formed from a film; and
   (b) before or after step (a), pumping within the tube on or into the nut spread or the tube in a separate stream one or more inclusions to form a variegated nut spread, without subjecting the tube to shear sufficient to cause homogenization of the variegated nut spread; and
   (c) then heat sealing the tube to form a container without homogenizing the nut spread and inclusions.

7. The process according to claim 6 wherein the nut spread is a peanut spread.

8. The process according to claim 7 wherein the peanut spread is a peanut butter.

9. The process according to claim 6 wherein the inclusion stream is pumped using a piston filler.

10. The process according to claim 6 wherein the inclusion is selected from one or more of the group consisting of fruit, chocolate, fruit flavored variegates, apricot, cherry, blueberry, guava, lemon, mango, raspberry, strawberry, papaya, marshmallow, banana, graham, puffed rice, bacon bits and mixtures thereof.

* * * * *